April 8, 1952 — F. A. FIRESTONE — 2,592,134

METHOD OF SUPERSONIC INSPECTION

Filed June 28, 1945

INVENTOR.
FLOYD A. FIRESTONE
BY
Joseph H. Lipschutz
ATTORNEY

Patented Apr. 8, 1952

2,592,134

UNITED STATES PATENT OFFICE 2,592,134

METHOD OF SUPERSONIC INSPECTION

Floyd A. Firestone, Ann Arbor, Mich., assignor to Sperry Products, Inc., Hoboken, N. J., a corporation of New York Application June 28, 1945, Serial No. 602,102

4 Claims. (Cl. 73—67)

1

This invention relates to a method for transmitting supersonic waves into solid material, and for detecting the supersonic waves when traveling in the solid material and being incident upon a bounding surface of the solid part or upon some discontinuity, such as a fissure, within the solid part. In my Patent No. 2,280,226, granted April 21, 1942, I have disclosed how supersonic waves may be used for the inspection of the interior of metal parts. That patent shows a means for transmitting supersonic waves into a metal part at right angles to its surface. A limitation of such testing method is that a supersonic wave transmitted into a metal part at right angles may not traverse the part of the interior which it is desired to test. It is, therefore, one of the objects of my invention to provide a method for sending supersonic waves into a metal part at any desired angle relative to the surface.

A further limitation of the supersonic testing method disclosed in my Patent No. 2,280,226 is that testing can be effected only in the limited region traversed by the supersonic wave, and that continuous movement of the testing device relative to the solid part under test must be made in order to test any considerable cross-sectional area of the solid part. It is a further object of my invention to provide a method for sending supersonic waves into a metal part at any desired angle relative to the surface while permitting the angle of wave transmission to be varied continuously without relative movement of the solid part with respect to the testing position. In this manner an entire cross-sectional area of a solid part may be tested in one testing position of the solid part relative to the testing mechanism and, also, portions of the interior not otherwise accessible may be tested.

It is a further object of this invention to provide a variable angle wave generating method which will generate longitudinal waves which, upon striking the solid part, will be broken down into longitudinal waves and shear waves in any desired relation, so that testing may be effected by either type of wave, or by both types, as desired.

A supersonic wave transmitted into the metal part at right angles to its surface may set up a series of standing waves caused by the repeated reflection of the wave from the incident surface of the solid part, and these standing waves interfere with the waves which arrive at the detector crystal after such waves have passed into or through the solid part. Thus, they tend to obscure and sometimes nullify the desired indications by producing fluctuations of received intensity which depend critically on the position of the crystal relative to the solid part. Prior attempts to solve this difficulty have run to providing long liquid paths which made them impractical. It is, therefore, one of the objects of this invention to provide a method for sending the supersonic wave into the solid part in such manner as to prevent standing waves from being set up and thus obscuring the desired indications, and to obtain this result by a compact, practical arrangement.

Still further objects and advantages of this invention will become apparent in the following detailed description thereof.

In the accompanying drawings.

Figure 1:
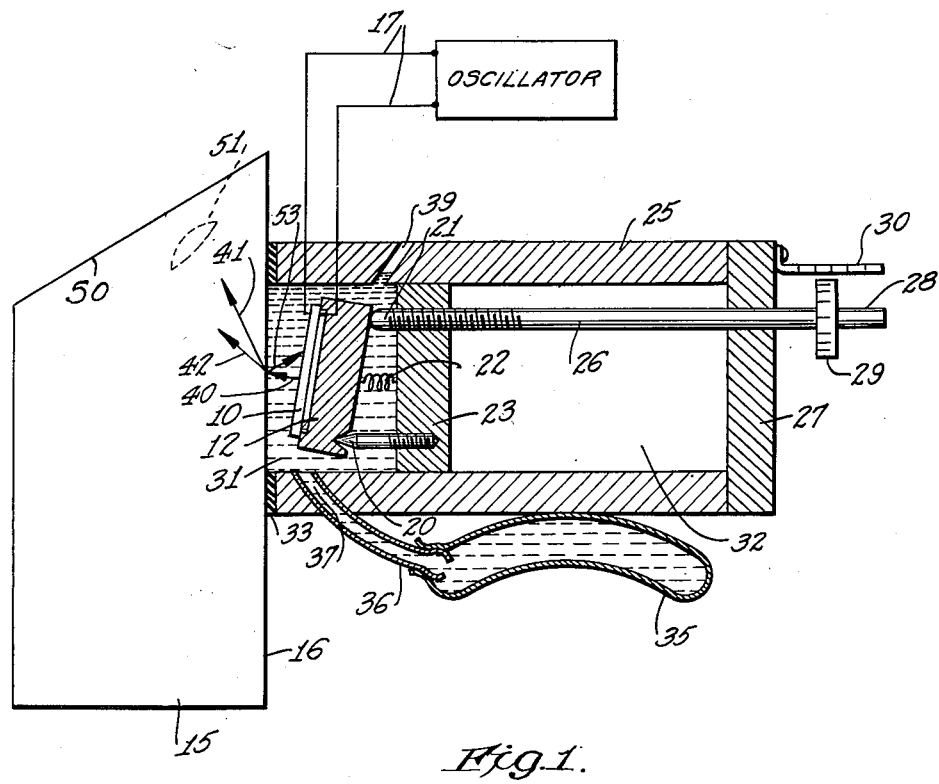
Fig. 1 is a vertical section through a portable mechanism for generating supersonic waves from a controlled angle, and for applying said mechanism to a solid part to be tested.

Referring to Fig. 1, I have shown one embodiment of my invention wherein an X-cut crystal 10 is fixed to a block 12 of suitable material, such as Bakelite, to form a single unit which is adapted for the testing of an object such as a solid metal part 15, having a face 16. The crystal 10 is one form of electro-acoustic transducer which may be employed herein, such transducer being defined as a device for transmitting waves when actuated by an electrical voltage or for generating voltage when actuated by a sound wave. Normally, the crystal would be applied directly to the face 16 and would be energized by suitable means such as an oscillator connected through electric conductors 17 to the opposite faces of the crystal. Supersonic waves would thus be generated in the solid part in a direction normal to the surface, and upon striking a bounding surface in its path, or upon striking an intermediate discontinuity, would be reflected back to the sending crystal or to an adjacent crystal. By measuring the time interval which elapses, a measure of the distance traversed by the wave through the material may be had and the presence of defects determined. One form of accomplishing these results is disclosed in my said Patent No. 2,280,226.

To overcome the limitations of the device disclosed in my said patent, I provide a method whereby the supersonic wave may be passed into the solid part 15 under test at an angle to normal, so that the angle of incidence measured with respect to the normal is different from zero. In order to do this, I must mount the crystal for movement relative to the solid part, and, hence, must space the crystal from the solid part. The space between the crystal and the solid part under test is filled with a liquid which will carry the sound waves to the solid part; since liquids have lower sound velocities than solids, the wave on entering the solid part will be refracted. The use of a liquid in this space, rather than gas, is advantageous because the specific acoustic resistance of liquids more nearly matches that of solids than does the specific acoustic resistance of air or other gas. Mercury is the most advantageous liquid to use because it has the highest specific acoustic resistance of all liquids. Specific acoustic resistance is defined as the density of the medium multiplied by the velocity of sound in the medium. For this purpose, I mount the crystal 10 and its supporting block 12 for pivotal movement on pivot points 20 so as to provide a pivotal axis normal to the paper in Fig. 1, so that the crystal may pivot around such axis in the plane of the paper to move its upper end toward and away from the surface 16 of the solid part and thus vary the angular relationship between the surface of the crystal and the surface 16 of the solid part. The crystal is normally held with its upper end biased against an adjustable stop 21 by means of a spring 22 connected at one end to the block 12 and at the other end to a fixed wall 23, forming a partition within a container 25, which is preferably a cylinder. The stop 21 forms one end of a rod 26 which is screw-threaded through the partition 23 and extends through the rear wall 27 of the cylinder so that it may be operated from outside the cylinder. The portion 28 of rod 26 which extends outside the container 25 may be provided with a vernier 29 co-acting with a scale 30 fixed to the container so that the position of the crystal 10 may be determined from outside the container.

The partition 23 divides the container 25 into a forward portion 31 and a rearward portion 32. The crystal and its mounting are positioned in the forward portion which is open at its end so that the container may be placed in engagement with the surface 16 of the solid part. A gasket 33 may be provided at the inner edge of container 25 so that a fluid tight engagement may be effected between the container and the solid part. A supply of liquid, preferably mercury, in a flexible container 35 may be connected to the interior of chamber 31 through a connection 36 leading into the flexible container 35, and at its other end connected into a duct 37 leading into a chamber 31. By compressing the flexible container 35, mercury may be caused to flow into the chamber 31 until the latter is full, the displaced air passing out of the chamber 31 through a vent 39.

The device is now ready to operate, and by setting the transducer into operation, a supersonic wave, such as a wave train, may be sent through the liquid and into the solid part. The wave will travel normally from the surface of the crystal 10, as indicated by the arrow 40, and on striking the solid part will be broken up into two separate types of waves, longitudinal and shear, the longitudinal waves traveling approximately twice as fast as the shear waves and, hence, being refracted to a greater degree as indicated by the arrows 41 and 42, which designate the longitudinal and shear wave beams respectively. The relationship between these angles of incidence and refraction is given by the following equations:

$$\frac{\sin \theta_i}{V_i} = \frac{\sin \theta_L}{V_L} = \frac{\sin \theta_S}{V_S}$$

where $\theta_1$ and $V_1$ are angle of incidence and velocity of propagation in the liquid, $\theta_L$ and $V_L$ are angle of refraction and velocity of propagation of longitudinal waves in the solid, and $\theta_S$ and $V_S$ are angle of refraction and velocity of propagation of shear waves in the solid. When the angles of incidence and refraction are small most of the refracted energy lies in the longitudinal wave 41, the shear wave 42 being comparatively weak. At larger angles of incidence and refraction a greater proportion of the refracted energy lies in the shear wave 42. At a certain angle of incidence the longitudinal waves 41 travel parallel to the surface of the solid part; this is called the critical angle for longitudinal waves. When the angle of incidence exceeds the critical angle for the longitudinal wave, no longitudinal wave is sent into the solid part and all of the refracted energy lies in the shear wave beam 42. The critical angle for longitudinal waves is an angle of incidence $\theta_{1L}$ such that $\sin \theta_{1L} = V_1/V_L$. The critical angle for shear waves is an angle of incidence $\theta_{1S}$ such that $\sin \theta_{1S} = V_1/V_S$.

Under the conditions shown in Fig. 1, if the beam 40 strikes the surface 50 or the flaw 51 it will be reflected back toward its point of origin and upon striking the surface 16 will pass into the liquid and strike the crystal normally. A principle of reciprocity insures that those conditions which give strongest waves transmitted from the liquid into the solid will give strongest waves transmitted from the solid back into the liquid.

Utilizing the principles set forth in my Patent No. 2,280,226, the distance between the point of entrance of the beam and the surface 50 or the presence of a fissure 51 may be detected. It is thus apparent that by this arrangement I am enabled to test in a direction other than normal to the surface of the solid part, and by reason of the adjustability of the angle between the crystal 10 and the surface 16, I may, with a single application of the container 25 to the solid part and therefore without relative movement between the solid part and the testing station, cause waves to enter the solid part at various angles, and, thus, an entire cross-sectional area of the solid part may be scanned and tested.

There will be a small amount of reflection from the surface 16, as indicated by the arrow 53, but such reflected beam will strike the crystal at such an angle that standing waves cannot be established and at such an angle as to have little effect on the crystal. The influence of successive reflections in the liquid can be further reduced by having the walls which contain the liquid absorbent to supersonic waves or by choosing a liquid which has considerable attenuation of waves with distance of travel.

Figure 2:
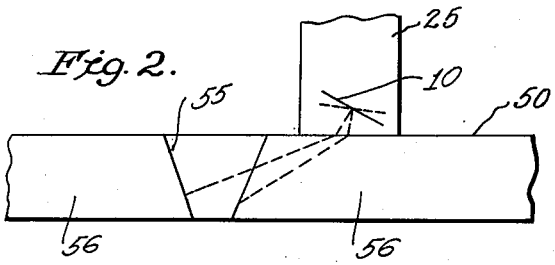
Fig. 2 is a diagrammatic illustration showing my method applied to the testing of an entire weld.

The utility of the variable angle transducer will be readily apparent. Thus, in Fig. 2 there is shown diagrammatically how it is possible to test an entire weld section with a single application of the testing mechanism, and merely by adjusting the angle of the crystal as indicated, the entering beam may scan the entire cross-sectional area of the weld which comprises the weld metal 55 between two metal sheets 56.

Figure 3:
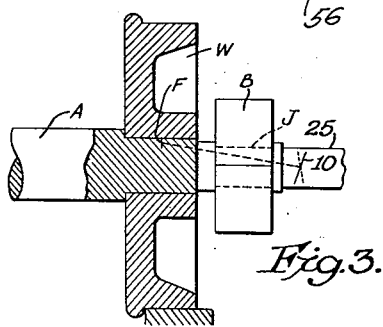
Fig. 3 is a view similar to Fig. 2 showing my method applied to the testing of a railroad car axle.

Similarly, referring to Fig. 3, there is shown a railroad car axle A with wheel W attached to the hub thereof, and which it is desired to test for flaws such as F occurring in the region adjacent the surface of the hub. The problem is complicated by the fact that the hub has a reduced journal portion J almost completely enclosed in bearings B so that the outer portion of the hub is not accessible. In this case it will be seen that by use of the variable angle transducer a beam can be projected directly to the flaw in an otherwise inaccessible region.

The efficiency of the device depends in considerable measure upon the use of wave trains of definite predetermined short duration. This duration may be on the order of one millionth of a second or less. It must be remembered that when a piezoelectric element such as the quartz crystal 10 is energized from a source of oscillation such as 61, the crystal will continue to oscillate after the energization by said source has ceased. This free vibration of the crystal will prolong the duration of the wave train and therefore interfere with the efficiency of testing, because many more cycles will be generated than desired and the vibration wave train may be so long as to make it impossible to observe reflections. Therefore, the arrangement which I have disclosed is particularly desirable because the liquid which is in contact with the free surface of the crystal will quickly damp any free vibrations after the excitation of the crystal has been stopped.

For some tests, the shear wave is more effective than the longitudinal wave so that by adjusting the sending and receiving crystals to the proper angle, the shear wave can be utilized. In many cases this will result in the longitudinal wave being beyond its critical angle and, therefore, not transmitted at all.

In the past, a thin oil film has often been used for establishing effective contact between a quartz crystal and a metal part, the film thickness being small in comparison with the wave length of the sound in the liquid film. That situation is not to be confused with the disclosure of this patent wherein the liquid in the space between the crystal surface and the surface of the solid part is more than a wave length thick.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of inspecting the interior of a solid part, which consists in maintaining said part in contact with a liquid, transmitting a supersonic wave through the liquid and into said part, the wave being transmitted through the liquid at an angle of incidence lying between the critical angles for longitudinal and shear waves in the solid part, and detecting waves emerging from the solid part.

2. The method of inspecting the interior of a solid part, which consists in transmitting a supersonic wave through a liquid which is in contact with the solid part, varying the angle of incidence of the wave for scanning a cross-sectional area of the solid part, and detecting waves emerging from the solid part into said liquid with an angle of emergence equal to the aforementioned angle of incidence.

3. The method of inspecting the interior of a solid part, which consists in maintaining said part in contact with a liquid, transmitting a beam of supersonic waves through the liquid and through said part at such angle of incidence other than zero, at such frequency, and at such incident beam cross-section in comparison with the part dimension in the direction of propagation of the refracted beam, that most of the incident wave energy is transmitted through the part in the form of a refracted beam of shear waves, or of refracted beams of both longitudinal and shear waves, depending upon the respective angle of incidence, and detecting waves emerging from the solid part.

4. The method of inspecting the interior of a solid part, which consists in maintaining said part in contact with a liquid, transmitting a beam of supersonic waves through the liquid and through said part at such angle of incidence other than zero, at such frequency, and at such incident beam cross-section in comparison with the part dimension in the direction of propagation of the refracted beam, that most of the incident wave energy is transmitted through the part in the form of a refracted beam of shear waves, or of refracted beams of both longitudinal and shear waves, depending upon the respective angle of incidence, said angle of incidence being such as to avoid standing waves and differing substantially from that angle of incidence at which most of the incident energy is converted into flexural waves in the part, the wave length in the part being short in comparison with the thickness of the part, and detecting waves emerging from the solid part.

FLOYD A. FIRESTONE.

REFERENCES CITED

The following references are of record in the file of this patent:

UNITED STATES PATENTS

| Number | Name | Date |
| --- | --- | --- |
| 1,734,975 | Loomis et al. | Nov. 12, 1929 |
| 2,280,226 | Firestone | Apr. 21, 1942 |
| 2,378,237 | Morris | June 12, 1945 |
| 2,398,701 | Firestone | Apr. 16, 1946 |

FOREIGN PATENTS

| Number | Country | Date |
| --- | --- | --- |
| 48,400 | Netherlands | May 15, 1940 |
| 893,459 | France | July 28, 1944 |
| 895,027 | France | Jan. 12, 1945 |
| 654,673 | Germany | Dec. 24, 1937 |

OTHER REFERENCES

A publication entitled "Supersonics at Work" in the Electronics Section of the Scientific American, July 1944, pages 10, 11, 12.